SUPPLEMENTARY FUEL MIXTURE FOR COLD STARTING DIESEL ENGINES

Stanley R. Newman, Beacon, and Herbert E. Vermillion, Wappingers Falls, N. Y., assignors to The Texas Company, New York, N. Y., a corporation of Delaware No Drawing. Application August 28, 1953, Serial No. 377,239

4 Claims. (Cl. 44—53)

This invention relates to a supplementary fuel mixture for cold starting diesel engines. More particularly, this invention discloses an improved fuel mixture for initiating combustion in diesel engines at sub-freezing temperatures.

In recent years, the problem of starting diesel engines at sub-freezing temperatures has been accentuated by the establishment of arctic military bases vital to the national defense.

In general, two procedures have been advanced to solve the problem of cold starting of diesel engines. One procedure has involved the use of a special starting-up fuel comprising a diesel oil fraction plus various aliphatic ethers such as diethyl ether, diethyl Carbitol and diethyl Cellosolve. Diethyl Cellosolve and diethyl Carbitol are commercial products manufactured and sold by Carbide and Carbon Chemicals Corporation and identified on page 5 of their booklet entitled "Ethers and Oxide," copyright 1949, as ethylene glycol diethyl ether and diethylene glycol diethyl ether, respectively. A major drawback of this type procedure has been the necessity of supplying a special fuel tank and means for introducing the special fuel into the combustion chamber of the diesel engine. The other approach to the problem of cold starting has involved the manifold injection of dialiphatic ethers, for examples, diethyl ether, in combination with the injection of regular diesel fuel into the combustion zone. Manifold injection of diethyl ether in combination with the use of a regular diesel fuel has the serious drawback that severe combustion shock is encountered and engine wear is noticeably increased. The process of this invention effects cold starting of diesel engines in a much shorter period of time than has been possible with previous procedures and, in addition, is satisfactory from the standpoint of combustion shock and engine wear.

In accordance with the invention, diesel engines are started at sub-freezing temperatures by using regular diesel fuel in the main injector while a mixture of a dialiphatic ether and a dialiphatic glycol ether is introduced into the air manifold. The mixture introduced into the air manifold comprises 2 to 50 percent dialiphatic ether of the general formula ROR' and 50 to 98 percent dialiphatic glycol ether of the general formula $$RO(CH_2CH_2O)_nR'$$

in the general formulae, R and R' are aliphatic radicals containing 1 to 4 carbon atoms and $n$ is an integer having a value of 1 to 4. Mixture of diethyl ether-diethyl Carbitol and of diethyl ether-diethyl Cellosolve are the preferred fuels for injection into the air manifold.

A particularly advantageous feature of this invention is that the manifold introduction of the mixture of ether and dialiphatic glycol ether does not require special apparatus. A Bosch injector specifically designed for spraying fuels into the intake manifold has been used with excellent results, but even better performance has been realized by injecting the special fuel into the intake manifold manually with a pump-type oil can, a Flit gun or an aerosol bomb. The superior results obtained with manual injection using an oil can prove that the invention is independent of the state of sub-division of the introduced fuel and is a direct function of its composition.

The fact that the invention appears to be independent of the mode of introduction into the manifold eliminates the necessity of installing an extra fuel tank and a spray injector in order to practice the process of the invention. Manual introduction of the dialiphatic ether-dialiphatic glycol ether blend by means of a pump-type oil can, a Flit gun or a Kelite gun is simply practiced without the need for installing extra equipment on each engine.

An outstanding advantage of cold starting diesel engines by manifold introduction of a dialiphatic ether-dialiphatic glycol ether blend is its freedom from combustion shock and excess engine wear. The process is entirely satisfactory from the standpoint of both lubrication and corrosion. When an engine which had completed 142 cold starting runs with manifold introduction of a diethyl ether-diethyl Carbitol blend was overhauled, the engine showed negligible wear and the valves, bearings, pistons and rings were almost like new although the oil temperature never rose above about —20° F. The excellent performance of dialiphatic ether-dialiphatic glycol ether blends in effecting cold starting of diesel engines by manifold introduction from the standpoint of lubrication and corrosion contrasts sharply with manifold introduction of ether which is accompanied by excessive engine wear and severe combustion shock.

In the general formula ROR' for the dialiphatic ether component of the manifold introduced mixture, R and R' represent aliphatic groups which may be either alkyl or alkenyl groups containing up to 4 carbon atoms; the R and R' may be identical or can be different alkyl or alkenyl groups containing up to 4 carbon atoms. Examples of aliphatic ethers which can be used in the process of the invention are diethyl ether, dimethyl ether, di-isobutyl ether, methyl n-propyl ether and ethyl isopropyl ether. Diethyl ether is preferred for use in the introduced mixture because of its greater availability and because optimum results are obtained therewith.

In the general formula $RO(CH_2CH_2O)_nR'$ for the dialiphatic glycol ether, $n$ is 1 to 4, and R and R' represent the same radicals as in the dialiphatic ether formula, that is, they are alkyl or alkenyl groups having 1 to 4 carbon atoms. Glycol ethers from which the manifold introduced mixture is prepared are exemplified by diethyl Cellosolve, $C_2H_5OC_2H_4OC_2H_5$, diethyl Carbitol, $$C_2H_5OC_2H_4OC_2H_4OC_2H_5$$

di-isopropyl Cellosolve, $C_3H_7OC_2H_4OC_3H_7$, ethyl propenyl Carbitol, $C_2H_5OC_2H_4OC_2H_4OC_3H_5$, di-n-butyl Cellosolve, $C_4H_9OC_2H_4OC_4H_9$ and diethyl tetraglycol, $$C_2H_5O(C_2H_4O)_4C_2H_5$$

Diethyl Carbitol and diethyl Cellosolve are the preferred glycol ethers for formulating mixtures to be used in accordance with the process of this invention.

The composition of the dialiphatic ether-dialiphatic glycol ether mixture is within the limits of 2 to 50 percent ether and 50 to 98 percent glycol ether. With diethyl ether-diethyl Carbitol and diethyl ether-diethyl Cellosolve mixtures, optimum results are obtained with a mixture containing between 5 and 30 percent ether and 70 to 95 percent glycol ether. Although the preferred composition varies with the particular ether and glycol ether comprising the introduced fuel mixture, in general it can be stated that best results are obtained with mixtures wherein the ether component constitutes 5 to about 30 percent of the ether-glycol ether mixture.

The supplementary fuel mixture of the invention for cold starting diesel engines was evaluated in a Single Cylinder Fairbanks-Morse Diesel Engine Model 45–B which was installed in a cold room maintained at −25° F. and below. As a diesel fuel, there was used a Texas Company product sold as Crystalite having an IBP-minimum of 325° F. and an EP-maximum of 525° F. Manifold introduction of the ether-dialiphatic glycol ether mixture was effected with a Bosch injector which sprays the fuel into the intake manifold and manually with an OC5-snap-on pump oiler, a Flit gun, a Windex sprayer or a Kelite gun.

The Bosch injector employed to evaluate the cold starting fuel comprises an American Bosch auxiliary fuel pump and nozzle. The Windex sprayer is the conventional bottle equipped with a manual piston pump as an integral part of the bottle cap; Windex sprayers are commercially used for home window cleaning and are found in almost all grocery stores. The Flit gun is the common aspirator type hand sprayer used for insecticides. The Kelite gun is a portable trigger-operated metal vessel which has provisions for pressuring by a gas such as air or nitrogen; the Kelite gun is made by Kelite Products, Inc. The effectiveness of the fuels of the invention in cold starting diesel engines was determined in terms of the average starting time in minutes required to initiate operation of the test Fairbanks-Morse engine. In the following table, there are shown results obtained when cold starting a Fairbanks-Morse engine at −25° F. and below by manifold injection of the ether-dialiphatic glycol ether mixture in comparison with manifold injection of ether alone, dialiphatic glycol ether alone and with the use of various cold starting fuel blends.

1.67 and 2.2 minutes, respectively, were required. Runs 7 to 18 illustrate cold starting with the process of this invention. The poorest average starting time, 0.6 minute in run 7 with a 50:50 mixture of diethyl ether and diethyl Carbitol, is significantly better than the best results obtained by any of the former methods of cold starting. The synergistic action of the ether-glycol ether blend is clearly apparent in this table.

Particularly significant are the very rapid average starting times resulting from the manual manifold introduction of diethyl ether-diethyl Carbitol and of diethyl ether-diethyl Cellosolve mixtures in runs 9 to 18. The absolute independence of the fuel mixtures of the invention of the fineness of the spray of the injected fuel is unusual and frees the invention from equipment limitation.

Obviously many modifications and variations of the invention, as hereinbefore set forth, may be made without departing from the spirit and scope thereof and, therefore, only such limitations should be imposed as are indicated in the appended claims.

We claim:
1. A supplementary fuel mixture for manifold introduction into a diesel engine for cold starting comprising 5 to 50 percent diethyl ether and 50 to 95 percent of a compound selected from the group consisting of ethylene glycol diethyl ether and diethylene glycol diethyl ether.
2. A supplementary fuel mixture for manifold introduction into a diesel engine for cold starting comprising 5 to 50 percent diethyl ether and 50 to 95 percent ethylene glycol diethyl ether.
3. A supplementary fuel mixture for manifold introduction into a diesel engine for cold starting comprising 5 to 50 percent diethyl ether and 50 to 95 percent diethylene glycol diethyl ether.
4. A supplementary fuel mixture for manifold introduction into diesel engine for cold starting comprising 5 to 30 percent of diethyl ether and 70 to 95 percent of a compound selected from the group consisting of ethylene glycol diethyl ether and diethylene glycol diethyl ether.

| | Fuel | Manifold Introduced Fuel | Means of Manifold Introduction | Temperature, °F. | Average Starting Time, Min. |
|---|---|---|---|---|---|
| 1 | Crystalite | None | | −30 | No start |
| 2 | 50-50 Diethyl Carbitol-Crystalite | do | | −30 | 2.48 |
| 3 | 50-50 Diethyl Carbitol-Stoddard Solvent | do | | −30 | 2.33 |
| 4 | Crystalite | Diethyl Carbitol | Flit gun | −30 | 2.20 |
| 5 | do | Diethyl Cellosolve | do | −30 | 0.90 |
| 6 | do | Diethyl Ether | do | −30 | 1 1.67 |
| 7 | do | 50-50 Diethyl Ether-Diethyl Carbitol | Bosch | −30 | 0.60 |
| 8 | do | 20-80 Diethyl Ether-Diethyl Carbitol | Bosch | −30 | 0.54 |
| 9 | do | 10-90 Diethyl Ether-Diethyl Carbitol | Oil can | −30 | 0.40 |
| 10 | do | 5-95 Diethyl Ether-Diethyl Carbitol | do | −30 | 0.20 |
| 11 | do | 20-80 Diethyl Ether-Diethyl Carbitol | do | −30 | 0.25 |
| 12 | do | do | Windex sprayer | −25 | 0.07 |
| 13 | do | 10-90 Diethyl Ether-Diethyl Carbitol | do | −25 | 0.21 |
| 14 | do | do | Kelite gun | −35 | 0.25 |
| 15 | do | 20-80 Diethyl Ether-Diethyl Carbitol | do | −39 | 0.18 |
| 16 | do | 10-90 Diethyl Ether-Diethyl Cellosolve | do | −43 | 0.27 |
| 17 | do | 20-80 Diethyl Ether-Diethyl Cellosolve | do | −38 | 0.30 |
| 18 | do | 30-70 Diethyl Ether-Diethyl Cellosolve | do | −41 | 0.29 |

[1] Value average of individual readings of from 0.55 min. to 3.31 min.

The above data clearly demonstrate the effectiveness of the supplementary fuel mixtures of the invention for cold starting diesel engines. Run 1 shows that a diesel engine cannot be started using a standard diesel fuel at −30° F. Runs 2 and 3 show the results obtained with the use of special cold starting fuels comprising a mixture of dialiphatic glycol ethers and hydrocarbon fractions; it is noteworthy that average starting times of over 2½ minutes were required. Runs 4 to 6 illustrate the use of manifold introduction of individual ethers in conjunction with the use of regular diesel fuels in cold starting; the best results were obtained by manifold introduction of diethyl Cellosolve with which cold starting was effected in 0.9 minute; with manifold introduction of diethyl ether and diethyl Carbitol separately, average starting times of

References Cited in the file of this patent

UNITED STATES PATENTS

| | | |
|---|---|---|
| 2,221,839 | Lipkin | Nov. 19, 1940 |
| 2,364,356 | Greathouse | Dec. 5, 1944 |
| 2,431,322 | Goodale | Nov. 25, 1947 |
| 2,516,787 | Moody | July 25, 1950 |
| 2,575,543 | Young | Nov. 20, 1951 |
| 2,658,490 | Bevis et al. | Nov. 10, 1953 |